(12) United States Patent
Vigholm

(10) Patent No.: US 10,578,136 B2
(45) Date of Patent: Mar. 3, 2020

(54) HYDRAULIC FLUID TANK ARRANGEMENT

(71) Applicant: VOLVO CONSTRUCTION EQUIPMENT AB, Eskilstuna (SE)

(72) Inventor: Bo Vigholm, Stora Sundby (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 388 days.

(21) Appl. No.: 15/515,637

(22) PCT Filed: Oct. 1, 2014

(86) PCT No.: PCT/SE2014/000121
§ 371 (c)(1),
(2) Date: Mar. 30, 2017

(87) PCT Pub. No.: WO2016/053151
PCT Pub. Date: Apr. 7, 2016

(65) Prior Publication Data
US 2017/0298965 A1    Oct. 19, 2017

(51) Int. Cl.
*B01D 19/00* (2006.01)
*F15B 21/044* (2019.01)
(Continued)

(52) U.S. Cl.
CPC ........ *F15B 21/044* (2013.01); *B01D 19/0057* (2013.01); *B01D 35/005* (2013.01);
(Continued)

(58) Field of Classification Search
None
See application file for complete search history.

(56) References Cited

U.S. PATENT DOCUMENTS 4,529,512 A * 7/1985 Williamson .......... F15B 21/044
                                                      210/120
4,865,632 A * 9/1989 Yano .................. B01D 19/0057
                                                       96/212
(Continued)

FOREIGN PATENT DOCUMENTS

CN    100453138 C    1/2009
CN    100497960 C    6/2009
(Continued)

OTHER PUBLICATIONS

International Search Report (dated Jun. 22, 2015) for corresponding International App. PCT/SE2014/000121.
(Continued)

*Primary Examiner* — Amber R Orlando
*Assistant Examiner* — Phillip Y Shao
(74) *Attorney, Agent, or Firm* — Sage Patent Group

(57) ABSTRACT

A hydraulic fluid tank arrangement for a working machine is provided, the arrangement including a hydraulic fluid tank; an inlet portion for receiving hydraulic fluid into the hydraulic fluid tank; and an oil filter arranged in fluid communication with the inlet portion; wherein the hydraulic fluid tank arrangement further includes a gas removal device arranged in fluid communication with the oil filter downstream the inlet portion and upstream the oil filter for removing gas from the hydraulic fluid before the hydraulic fluid reaches the oil filter. A method for removing gas from hydraulic fluid contained in a hydraulic fluid tank arrangement is also provided.

6 Claims, 4 Drawing Sheets

(51) Int. Cl.
    *E02F 9/08* (2006.01)
    *F15B 1/26* (2006.01)
    *E02F 9/22* (2006.01)
    *F15B 21/047* (2019.01)
    *B01D 35/00* (2006.01)
    *B04C 9/00* (2006.01)
    *F15B 21/041* (2019.01)
    *E02F 3/28* (2006.01)

(52) U.S. Cl.
    CPC .............. *B04C 9/00* (2013.01); *E02F 9/0883* (2013.01); *E02F 9/226* (2013.01); *F15B 1/26* (2013.01); *F15B 21/041* (2013.01); *F15B 21/047* (2013.01); *B04C 2009/002* (2013.01); *E02F 3/283* (2013.01)

(56) References Cited

U.S. PATENT DOCUMENTS

| | | | | |
|---|---|---|---|---|
| 4,878,924 | A * | 11/1989 | Yano | B01D 19/0057 96/212 |
| 4,997,556 | A * | 3/1991 | Yano | B01D 27/144 184/6.24 |
| 5,277,154 | A * | 1/1994 | McDowell | B01D 45/06 123/41.86 |
| 5,775,103 | A | 7/1998 | Invast | |
| 5,879,140 | A * | 3/1999 | Ellison | F01M 1/02 184/6.24 |
| 7,105,044 | B2 * | 9/2006 | Konishi | F15B 1/26 210/188 |
| 2005/0229595 | A1 | 10/2005 | Hoetger et al. | |
| 2009/0056553 | A1 | 3/2009 | Konishi et al. | |
| 2012/0060693 | A1 * | 3/2012 | Sasaki | B01D 46/543 96/139 |
| 2014/0238923 | A1 | 8/2014 | Miyasaka | |

FOREIGN PATENT DOCUMENTS

| | | |
|---|---|---|
| CN | 201433947 Y | 3/2010 |
| CN | 102762874 A | 10/2012 |
| CN | 203570711 U | 4/2014 |
| DE | 19939970 A1 | 3/2001 |
| DE | 10162575 A1 | 7/2002 |
| DE | 10323068 A1 | 12/2003 |
| EP | 2098689 A2 | 9/2009 |
| JP | 2007229579 A | 9/2007 |
| JP | 2008030232 A | 2/2008 |
| SU | 1211477 A1 | 2/1986 |

OTHER PUBLICATIONS

European Official Action (dated Jun. 25, 2018) for corresponding European App. EP 14903107.2.
Chinese Official Action (dated Nov. 5, 2018) for corresponding Chinese App. 201480082099.2.
"Electric Equipment Test Method and Diagnosis Technology", Shi Jiayan et al., p. 268, China Electric Power Press: 1st edition.
Chinese Office Action for Chinese Application No. 201480082099.2 dated Jul. 26, 2019, 14 Pages.

* cited by examiner

HYDRAULIC FLUID TANK ARRANGEMENT

BACKGROUND AND SUMMARY

The present invention relates to a hydraulic fluid tank arrangement. The invention also relates to a method for removing gas from hydraulic fluid contained in a hydraulic fluid tank arrangement. The invention is applicable on vehicles, in particularly working machines such as e.g. wheel loaders, articulated haulers, dump trucks, etc. Although the invention will mainly be described in relation to a working machine, it is also applicable for other vehicles utilizing a hydraulic fluid tank for supplying and receiving hydraulic fluid from/to different components of the vehicle.

In the field of heavy vehicles, working machines in the form of wheel loaders, articulated haulers, dump trucks, etc. are frequently used at construction sites or the like. These working machines often comprise hydraulically operated arrangements, such as e.g. hydraulic cylinders, to control the operation of equipment associated with the working machine. For example, a wheel loader comprises a bucket which is controlled by means of at least one hydraulic lifting cylinder and at least one hydraulic tilting cylinder. The hydraulic cylinders are connected to a hydraulic fluid tank arrangement which delivers hydraulic fluid to the hydraulic cylinders and which receives hydraulic fluid from the hydraulic cylinders. Hence, a closed loop is provided where the hydraulic fluid is directed from the hydraulic fluid tank arrangement to a hydraulic cylinder, and thereafter back to the hydraulic fluid tank arrangement by means of a return line.

When the hydraulic fluid is provided to the hydraulic fluid tank arrangement via the return line, it often comprises a substantial amount of gas bubbles. The gas bubbles are generated during the operation of the hydraulic cylinder and are thus provided into the hydraulic fluid tank arrangement. The gas bubbles are unfavorable for the operation of the hydraulic cylinders since they may cause cavitation damages in the hydraulic fluid system. Also, the overall capacity utilization of the cylinders may be reduced if gas bubbles are present in the system. Further, the control of operation of the hydraulic cylinders may be reduced by means of uncontrolled disturbances that arise due to the gas bubbles.

Prior art solutions describe various ways of removing gas bubbles from the hydraulic fluid in a fluid tank. For example, a solution to the problem has been to introduce a deaeration device in the hydraulic fluid tank that removes the gas bubbles from the hydraulic fluid before the hydraulic fluid is evacuated from the tank and directed to e.g. the hydraulic cylinders of the working machine.

However, although prior art describes a way of removing gas bubbles from hydraulic fluid in a fluid tank, further improvement is still needed, such as, for example, to further increase the reliability of sufficiently removing the gas bubbles from the hydraulic fluid.

It is desirable to provide a hydraulic fluid tank arrangement which improves the removal of gas from hydraulic fluid compared to the prior art solutions.

According to a first aspect of the present invention, there is provided a hydraulic fluid tank arrangement for a working machine, the arrangement comprising a hydraulic fluid tank; an inlet portion for receiving hydraulic fluid into the hydraulic fluid tank; and an oil filter arranged in fluid communication with the inlet portion; wherein the hydraulic fluid tank arrangement further comprises a gas removal device arranged in fluid communication with the oil filter downstream the inlet portion and upstream the oil filter for removing gas from the hydraulic fluid before the hydraulic fluid reaches the oil filter.

The inlet portion of the hydraulic fluid tank arrangement should in the following and throughout the entire description be interpreted as the inlet of the tank arrangement where hydraulic fluid that has circulated through the hydraulic circuit enters. For example, the hydraulic circuit may comprise the hydraulic cylinders of the working machine.

Furthermore, it should be understood that the gas removal device is arranged in direct downstream fluid communication with the inlet portion. Thus, no oil filter is present between the inlet portion and the gas removal device. In detail, the gas removal device is in filter-free downstream fluid communication with the inlet portion of the hydraulic fluid tank arrangement. Still further, the gas removal device may be any suitable arrangement that removes gas from hydraulic fluid. As an example of a gas removal device, a cyclone deaerator will be described below.

The oil filter should be understood as a filter which is used for removing contaminants from the hydraulic fluid. Thus, after the hydraulic fluid has passed the gas removal device, contaminants, i.e. micro particles, are removed from the hydraulic fluid by means of the oil filter.

The present invention is based on the insight that by providing a gas removal device upstream the oil filter, the gas bubbles contained in the hydraulic fluid will be removed from the hydraulic fluid before the hydraulic fluid reaches the oil filter. Advantages of removing gas bubbles from the hydraulic fluid before the hydraulic fluid reaches the oil filter is that it is easier to separate the relatively large bubbles that enters the hydraulic fluid tank arrangement, in comparison to arranging the gas removal device in downstream fluid communication with the oil filter which will result in relatively large gas bubbles being divided by the filter into smaller gas bubbles which are more difficult to separate from the hydraulic fluid when entering the gas removal device. Hence, when gas bubbles are directed through a filter they will be divided into smaller gas bubbles. Also, the relatively large gas bubbles separated from the hydraulic fluid by means of the gas removal device will rise towards the surface of the hydraulic fluid in the hydraulic fluid tank in a more rapid manner compared to smaller gas bubbles. An effect of having an increased upward directing speed of the bubbles, i.e. such that the gas bubbles reach the hydraulic fluid surface more rapidly, is that the risk of getting bubbles into e.g. a pump provided in connection to an outlet of the hydraulic fluid tank arrangement is reduced. For example, if the hydraulic fluid velocity down to the pump is higher than the upward directing velocity of the rising gas bubbles, the gas bubbles will be sucked down to the pump. This is hence at least partly alleviated by separating larger gas bubbles which will have an increased upward directing velocity in comparison to smaller gas bubbles. Still further, larger gas bubbles have an increased tendency to crack when they reach the hydraulic fluid surface in comparison to smaller gas bubbles. Hereby, a total reduction of gas bubbles will be provided in the hydraulic fluid tank arrangement.

Still further, in a working machine there is often a relatively large amount of differential flow in the tank, which means that the flow out from the hydraulic fluid tank arrangement is relatively large in comparison to the flow into the hydraulic fluid tank arrangement, or vice versa that the flow into the hydraulic fluid tank arrangement is relatively large in comparison to the flow out from the hydraulic fluid tank arrangement. By providing the gas removal device in direct fluid communication downstream the inlet portion of the hydraulic fluid tank arrangement, and in upstream fluid communication with the oil filter, will provide approximately the same hydraulic fluid flow into the gas removal device as is directed out from the gas removal device. In detail, when using a pump to provide hydraulic fluid to the cylinders, there will be a differential flow in the tank which means that the flow of hydraulic fluid out from the tank is larger than the flow into the tank. By providing the gas removal device according to the invention separates the gas removal device from the pump which makes it a suitable environment for the gas removal device since the differential flow will be relatively low. Having a gas removal device in connection with the pump, according to prior art solutions, will on the other hand result in that hydraulic fluid is also taken from the tank to sufficiently supply fluid to the pump, and thus bypassing the gas removal device providing a relatively large differential flow which is not satisfactory.

According to an example embodiment, the hydraulic fluid tank arrangement may further comprise an outlet portion for providing hydraulic fluid out from the hydraulic fluid tank.

The outlet portion of the hydraulic fluid tank arrangement should in the following and throughout the entire description be interpreted as an outlet where hydraulic fluid is evacuated from the hydraulic fluid tank arrangement to e.g. hydraulic cylinders of the working machine.

According to an example embodiment, the hydraulic fluid tank may comprise a first hydraulic fluid chamber, the gas removal device being arranged in fluid communication with the first hydraulic fluid chamber for providing gas removed from the hydraulic fluid into the first hydraulic fluid chamber.

An advantage is that the gas removed from the hydraulic fluid is provided into a well defined space, which reduces the risk of providing the removed gas into the outlet portion of the fluid tank arrangement.

According to an example embodiment, the hydraulic fluid tank may comprise a second hydraulic fluid chamber, the second hydraulic fluid chamber being arranged downstream the oil filter in fluid communication with the oil filter and the outlet portion of the hydraulic fluid tank arrangement.

Hereby, the hydraulic fluid entering the oil filter downstream the gas removal device will be provided into the second chamber. Thus, the second chamber will be provided with hydraulic fluid which is substantially free from gas bubbles. An advantage is thus that the gas removed from the hydraulic fluid is provided into the first hydraulic fluid chamber and the hydraulic fluid which is substantially free from gas bubbles is provided into the second hydraulic fluid chamber. Hereby, the relatively clean and gas free hydraulic fluid provided in the second hydraulic fluid chamber can be used for further operation of e.g. the hydraulic cylinders of the working machine.

According to an example embodiment, the first hydraulic fluid chamber may be in fluid communication with the second hydraulic fluid chamber. An advantage is that the hydraulic fluid in the first hydraulic fluid chamber may also be used for further operation of e.g. the hydraulic cylinders of the working machine. The first and the second hydraulic fluid chambers may be separated by means of a separation wall as will be described further below, or the first and the second hydraulic fluid chambers may be arranged as separate fluid tanks or reservoirs which are interconnected to each other by means of a hose or tube, or the like.

According to an example embodiment, the hydraulic fluid tank arrangement may further comprise a venting filter arranged in communication with the first hydraulic fluid chamber for directing gas in the first hydraulic fluid chamber out from the hydraulic fluid tank arrangement.

Hereby, gas which is present in the first hydraulic fluid chamber above the surface of the hydraulic fluid therein can efficiently be directed out from the hydraulic fluid tank arrangement via the venting filter. The venting filter may itself have filter properties which prevent contamination to be expelled from the hydraulic fluid tank arrangement to the surrounding environment of the hydraulic fluid tank arrangement.

According to an example embodiment, the gas removal device may comprise a gas outlet portion for evacuating the gas removed from the hydraulic fluid out from the gas removal device.

The hydraulic fluid entering the gas removal device may, due to a slight overpressure in the gas removal device, be forced towards the same outlet as the gas bubbles. In order to enable that the majority of the hydraulic fluid is directed towards the oil filter while the removed gas is directed through the gas outlet portion, a gas outlet portion is provided. The gas outlet portion should thus be interpreted as a portion of the gas removal device in which the gas exits the gas removal device. The gas outlet portion may, according to an example, be formed as an orifice which forces the main part of the hydraulic fluid entering the gas removal device to be directed towards the oil filter.

According to an example embodiment, the hydraulic fluid tank arrangement may further comprise a separation wall dividing the hydraulic fluid tank into the first hydraulic fluid chamber and the second hydraulic fluid chamber, the separation wall extending from an upper wall of the hydraulic fluid tank to a level below the gas outlet portion.

Hereby, a clear separation of the first and second fluid chambers is provided. An advantage of arranging the separation wall to extend to a level below the gas outlet portion is that it is further secured that the removed gas is directed into the first hydraulic fluid chamber. Hence, the separation wall further reduces the risk of providing gas bubbles into the second hydraulic fluid chamber. Moreover, providing the gas bubbles into the first hydraulic fluid chamber which is separated from the second hydraulic fluid chamber provides an environment for the gas bubbles which is not affected by the suction of hydraulic fluid out from the second hydraulic fluid chamber. Hence, the gas bubbles will be able to rise toward the surface of the first hydraulic fluid chamber where they will be able to crack. The separation wall may extend vertically from the upper wall of the hydraulic fluid tank. However, the present invention should not be construed as limited to a vertical extension having a 90-degrees angle from the upper wall, the separation wall may have an inclination of more/less then 90 degrees in relation to the upper wall, such that a horizontal component of the separation wall is present as well.

According to an example embodiment, the separation wall may further comprise an opening for directing gas in the second hydraulic fluid chamber into the first hydraulic fluid chamber.

Gas present in the second hydraulic fluid chamber may thus be directed into the first hydraulic fluid chamber and thereafter further through the venting filter. A gas passage is thus provided between the first and the second hydraulic fluid chambers.

According to an example embodiment, the hydraulic fluid tank arrangement may comprise a pump arranged in fluid communication with the outlet portion downstream the outlet portion.

Hereby, hydraulic fluid is allowed to be pumped to the various hydraulically controlled components of the working machine. The pump may be a hydraulic pump.

According to an example embodiment, the gas removal device may be a cyclone deaerator.

Hereby, a relatively simple and cheap gas removal device may be provided. A cyclone deaerator is also advantageous since it can be made relatively small in size while still being robust and functional.

According to a second aspect of the present invention, there is provided a working machine comprising a hydraulic fluid tank arrangement according to any one of the above described embodiments in relation to the first aspect of the present invention.

According to a third aspect of the present invention, there is provided a method for removing gas from hydraulic fluid contained in a hydraulic fluid tank arrangement comprising a hydraulic fluid tank, wherein the method comprises the steps of providing hydraulic fluid to an inlet portion of the hydraulic fluid tank arrangement; directing the hydraulic fluid through a gas removal device arranged in downstream fluid communication with the inlet portion for removing gas from the hydraulic fluid; and directing the hydraulic fluid to an oil filter arranged in downstream fluid communication with the gas removal device.

According to an embodiment, the hydraulic fluid tank may comprise a first hydraulic fluid chamber, the gas removal device being arranged in fluid communication with the first hydraulic fluid chamber, wherein the method may further comprise the step of providing the gas removed from the hydraulic fluid into the first hydraulic fluid chamber.

Further effects and features of the second and third aspects of the present invention are similar to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein.

DETAIL DESCRIPTION

Figure 1:
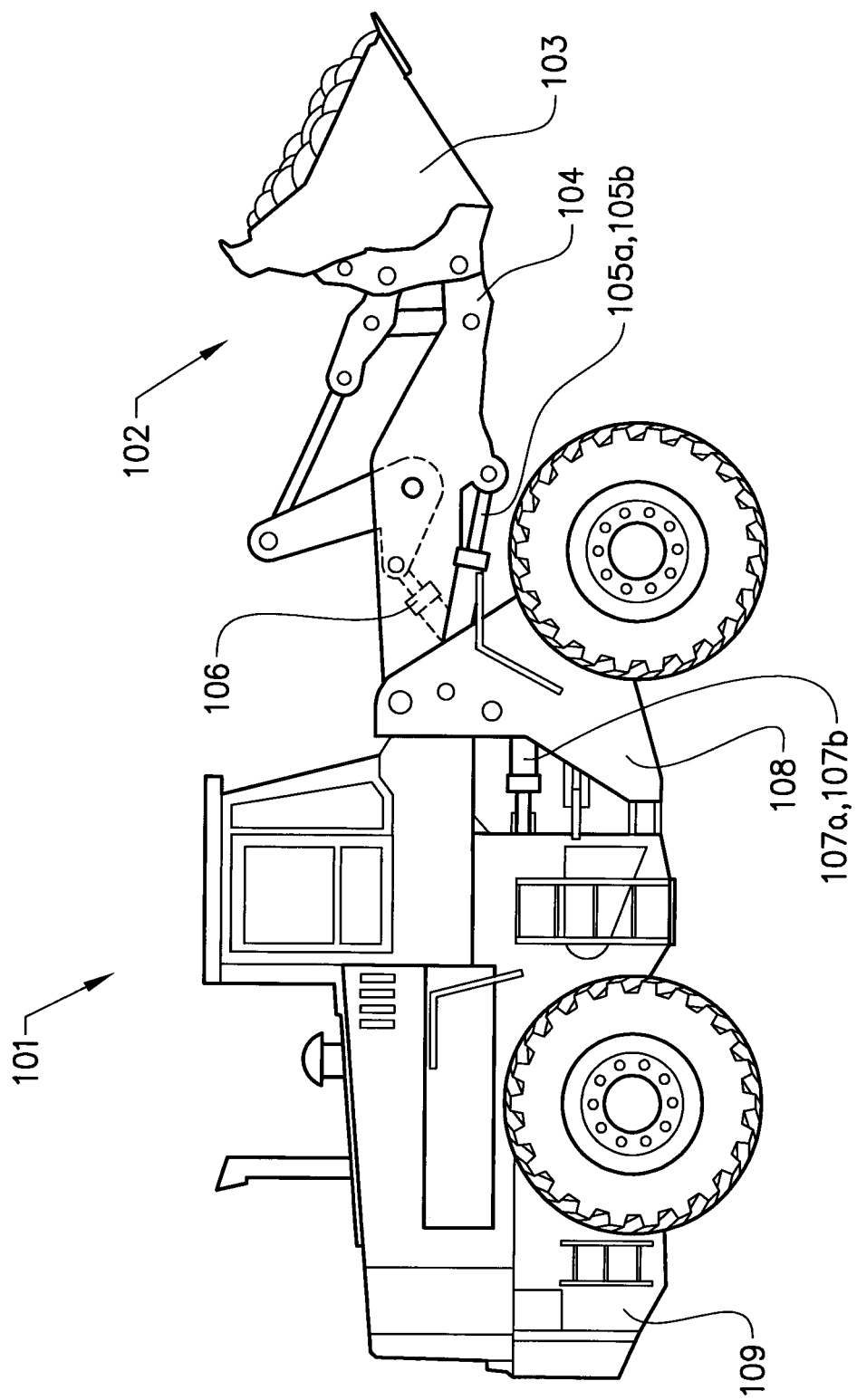
FIG. 1 is a lateral side view illustrating a working machine in the form of a wheel loader having an implement for loading operations, and a hydraulic system for operating the implement and steering the wheel loader.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 2:
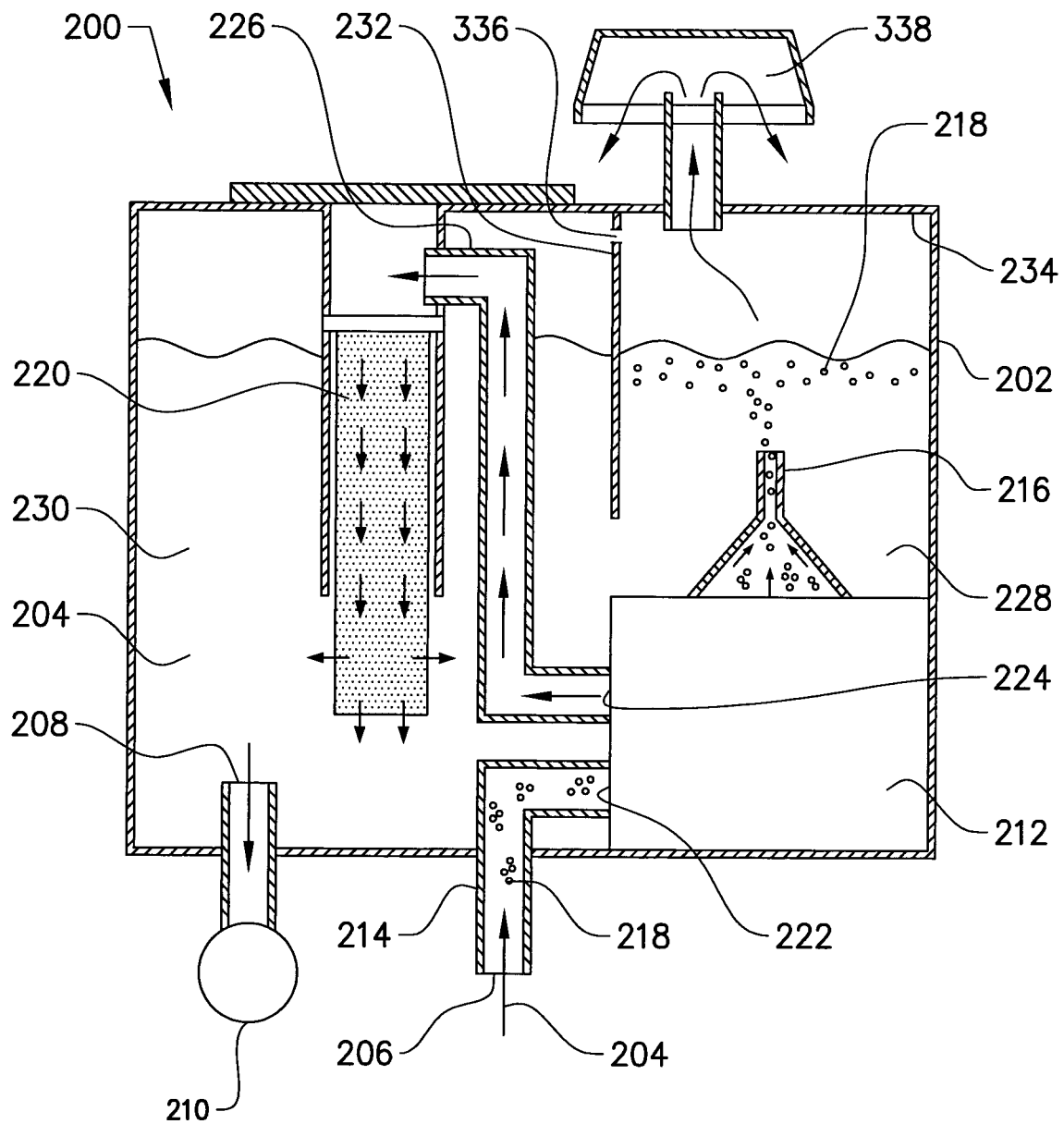
FIG. 2 shows a schematic view illustrating a hydraulic fluid tank arrangement according to an example embodiment of the present invention.

FIG. 1 is a lateral side view illustrating a working machine 101 in the form of a wheel loader having an implement 102 for loading operations. The term "implement" is intended to comprise any kind of tool using hydraulics, such as a bucket, a fork or a gripping tool arranged on a wheel loader, or a container arranged on an articulated hauler. The implement illustrated in FIG. 1 comprises a bucket 103 which is arranged on an arm unit 104 for lifting and lowering the bucket 103. The bucket 103 can also be tilted or pivoted relative to the arm unit 104. The wheel loader 101 is provided with a hydraulic system comprising at least one hydraulic machine (not shown in FIG. 1). According to an example embodiment, and as depicted in FIG. 2, the hydraulic machine can be a hydraulic pump 210. The wheel loader 101 further comprises two hydraulic cylinders 105a, 105b for the operation of the arm unit 104 and a hydraulic cylinder 106 for tilting the bucket 103 relative to the arm unit 104. Furthermore, the hydraulic system comprises working cylinders 107a, 107b for turning the wheel loader by means of relative movement of a front body 108 and a rear body 109. In other words, the working machine is frame-steered by means of the steering cylinders 107a, 107b.

Reference is now made to FIG. 2 which illustrates a hydraulic fluid tank arrangement 200 according to an example embodiment of the present invention. The hydraulic fluid tank arrangement 200 comprises a hydraulic fluid tank 202 arranged to be provided with hydraulic fluid 204. The hydraulic fluid 204 can, for example, be hydraulic oil. The specific type of hydraulic fluid is however not a scope of the present invention and depends of course on the specific use and purpose. Moreover, the hydraulic fluid tank arrangement further comprises an inlet portion 206 and an outlet portion 208. The inlet portion 206 is configured to receive hydraulic fluid 204 from hydraulically operated arrangements of the working machine, such as e.g. the above described hydraulic cylinders 105a, 105b, 106 depicted in and described in relation to FIG. 1. Hence, after the hydraulic fluid has been used for operation of the hydraulic cylinders, the hydraulic fluid is provided into the hydraulic tank 202 through the inlet portion 206. The outlet portion 208 on the other hand is a position of the hydraulic fluid tank arrangement 200 where the hydraulic fluid 204 is evacuated from the hydraulic fluid tank 202 to e.g. the hydraulic cylinders depicted in FIG. 1. Hence, when the hydraulic cylinder is to be operated, the hydraulic fluid is drawn out of the outlet portion 208 of the hydraulic fluid tank 202. For this purpose, the outlet portion 208 is in fluid communication with a hydraulic pump 210 that forces the hydraulic fluid out from the hydraulic fluid tank 202. The hydraulic pump 210 is in the example embodiment depicted in FIG. 3 in downstream fluid communication with the outlet portion 208.

Moreover, the hydraulic fluid tank arrangement 200 further comprises a gas removal device 212 arranged in downstream fluid communication with the inlet portion 206. More specifically, a fluid inlet 222 of the gas removal device 212 is arranged in fluid communication with the inlet portion 206. An example embodiment of the gas removal device 212 is described below in relation to FIGS. 3 and 4. The gas removal device may also be referred to as a deaerator and is configured to remove gas from the hydraulic fluid 204 entering the hydraulic fluid tank, which will be further described below. Moreover, the gas removal device 212 may be arranged in downstream fluid communication with the inlet portion 206 by means of an inlet conduit 214. Still further, the gas removal device 212 comprises a gas outlet portion 216 through which the removed gas is configured to be evacuated. Although the gas removal device 212 is depicted in FIG. 2 as positioned within the hydraulic fluid tank 202, the present invention is equally applicable with a gas removal device 212 arranged and positioned on the exterior of the hydraulic fluid tank 202.

Furthermore, the hydraulic fluid tank arrangement 200 comprises an oil filter 220. The oil filter 220 is arranged in downstream fluid communication with the gas removal device 212. More specifically, the oil filter 220 is arranged in fluid communication with a fluid outlet 224 of the gas removal device 212. Hereby, hydraulic fluid 204 will be directed into the oil filter 220 after passing through the gas removal device 212. The oil filter 220 may be arranged in fluid communication with the gas removal device 212 by means of an outlet conduit 226 arranged between the gas removal device 212 and the oil filter 220.

The hydraulic fluid tank 202 further comprises a first 228 and a second 230 hydraulic fluid chamber. The gas removal device 212 is arranged in fluid communication with the first hydraulic fluid chamber 228 and the oil filter 220 is arranged in fluid communication with the second hydraulic fluid chamber 230. In detail, and as depicted in the example embodiment of FIG. 2, the gas outlet portion 216 of the gas removal device 212 is arranged in upstream fluid communication with the first hydraulic fluid chamber 228 and the oil filter 220 is arranged in upstream fluid communication with the second hydraulic fluid chamber 230. The gas bubbles 218 removed from the hydraulic fluid 204 will thus be provided into the first hydraulic fluid chamber 228 via the gas outlet portion.

Moreover, the first 228 and the second 230 hydraulic fluid chambers are arranged in fluid communication with each other, which means that hydraulic fluid is allowed to be transported between the first 228 and the second 230 hydraulic fluid chambers without passing through the oil filter 220. However, the first 228 and second 230 hydraulic fluid chambers are separated from each other by means of a separation wall 232 which extends from an upper wall 234 of the hydraulic fluid tank 202 down to a level below the gas outlet portion 216. Hereby, the gas 218 removed from the hydraulic fluid 204 will be provided into the first hydraulic fluid chamber 228 at a vertical level above a lower end position of the separation wall 232. Furthermore, the separation wall 232 is provided with an opening 336 for allowing air present in the second hydraulic fluid chamber 230 to be transported into the first hydraulic fluid chamber 228 and further out through the hydraulic fluid tank arrangement 200 via a venting filter 338. Although only one venting filter 338 is depicted in FIG. 2, the present invention may function equally as well with a separate venting filter for each of the first 228 and the second 230 hydraulic fluid chambers. In such a case there is no need for an opening 336 in the separation wall 232.

Figure 3:
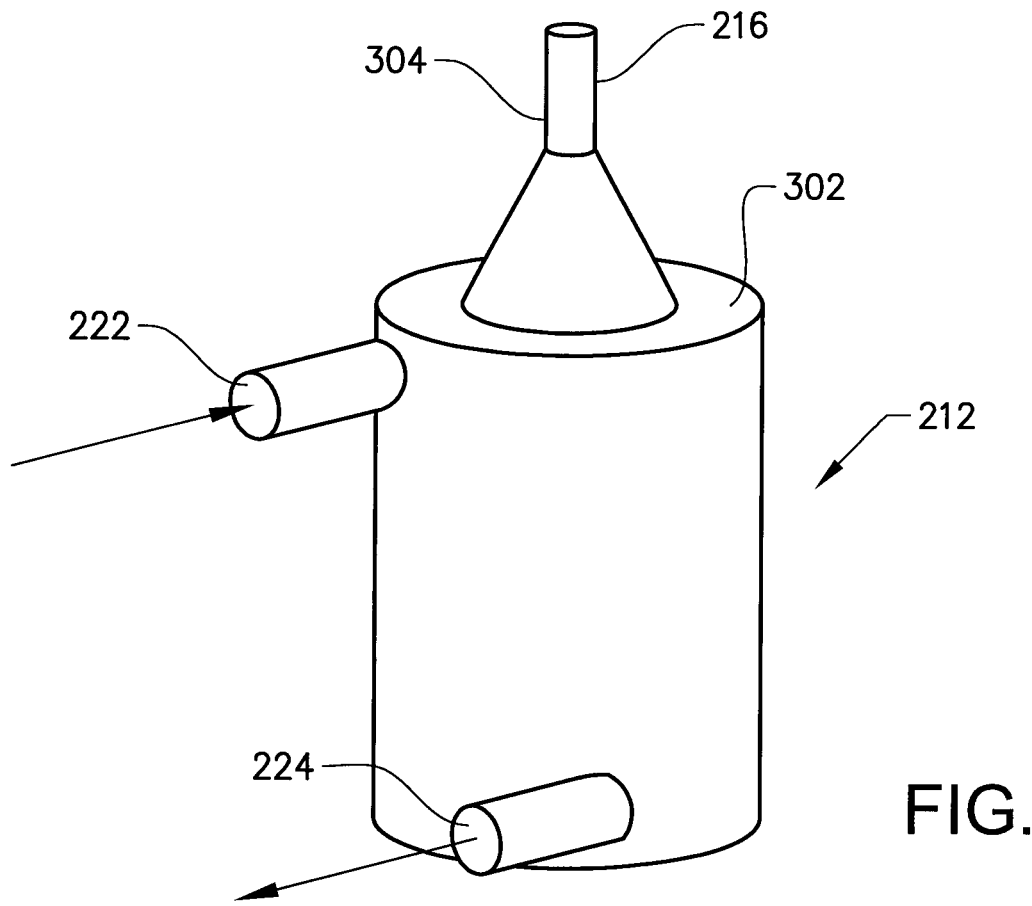
FIG. 3 shows a perspective view of a gas removal device according to an example embodiment of the present invention.
Figure 4:
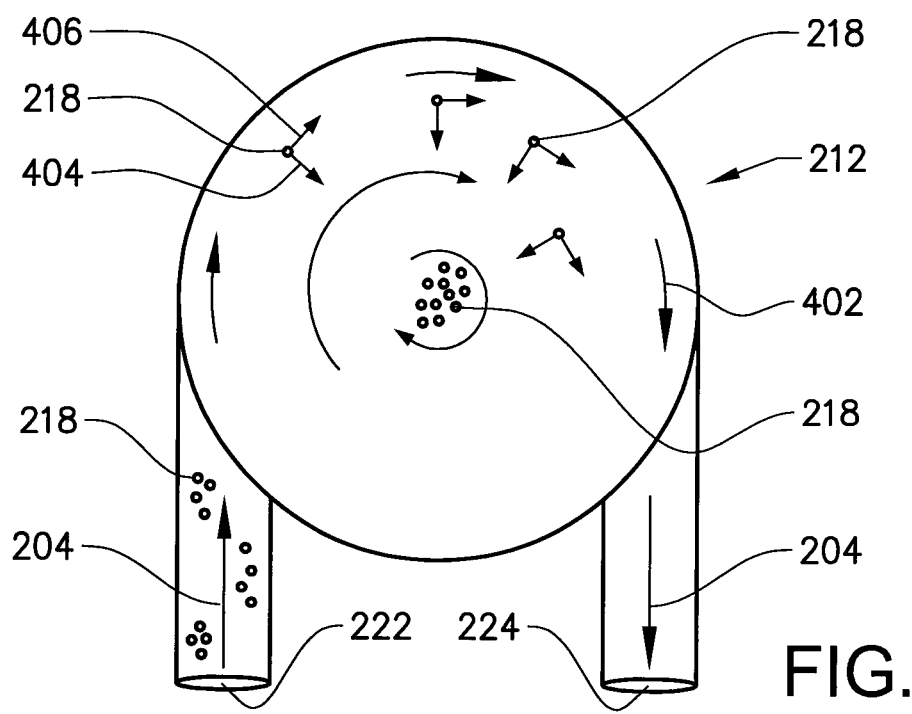
FIG. 4 is a top view of the interior configuration of the exemplary gas removal device depicted in FIG. 3.

Reference is now made to FIGS. 3 and 4 which illustrate an example embodiment of a gas removal device 212. More specifically, the example embodiment depicted in FIGS. 3 and 4 is a cyclone deaerator. According to the embodiment depicted in FIG. 3, the gas removal device 212 comprises the fluid inlet 222 at an upper portion of the gas removal device, and the fluid outlet 224 at a lower portion of the gas removal device 212. Also, a gas outlet portion 216 is arranged at the top surface 302 of the gas removal device 212. In detail, the gas outlet portion 216 is provided with a restriction 304, here in the form of an orifice. The restriction 304 is arranged in such a way as to force the main part of the hydraulic fluid entering the gas removal device 212 to be forced out through the fluid outlet 224. In more detail, the hydraulic fluid entering the gas removal device will have a slight overpressure which may force the hydraulic fluid to be directed to the same outlet as the gas bubbles. The gas outlet portion 216, with its restriction 304, thus prevents the main part of the hydraulic fluid from being directed into the first hydraulic fluid chamber 228. This is achieved since the gas bubbles have much lower viscosity than the hydraulic fluid, which will allow the gas bubbles to be directed through the restriction while preventing the hydraulic fluid from being provided therethrough. The specific dimensions of the gas outlet portion 216 and the restriction 304 are of course depending on the specific use, quality of hydraulic fluid, etc., and the present invention should hence not be construed as limited to a specific dimension thereof.

With particular reference to FIG. 4, when the hydraulic fluid 204 enters the gas removal device 212 through the fluid inlet 222, the hydraulic fluid 204 comprises gas bubbles 218. The hydraulic fluid 204 and the gas bubbles 218 are thus provided to the internal area of the gas removal device 212. Within the gas removal device 212, the hydraulic fluid 204 is exposed to a rotating movement around an axial geometric axis of the gas removal device 212. Hereby, the hydraulic fluid 204 will be exposed to a circumferential movement 402 as well as an axial movement downwards towards the fluid outlet 224 of the gas removal device 212. During the movement of the hydraulic fluid, the gas bubbles 218 will be forced towards a center of the gas removal device 212 and the hydraulic fluid will be forced towards the inlet periphery of the gas removal device 212 due to the difference in density between the gas bubbles 218 and the hydraulic fluid 204. In detail, the gas bubbles 218 have lower density in comparison to the hydraulic fluid 204 which will force the gas bubbles 218 towards the center and the hydraulic fluid towards the periphery of the gas removal device 212. The gas bubbles will hence have a radial force 404 pulling the gas bubbles towards the center and a tangential force 406 pulling the gas bubbles 218 in the circumferential direction of the gas removal device 212. When the gas bubbles 218 are in a center portion of the gas removal device 212 they will rise towards the gas outlet portion 216 and further into the first hydraulic chamber 228 of the hydraulic fluid tank 202. This is caused by the lower gravity of the gas bubbles in comparison to the hydraulic fluid, as well as the slight overpressure that arise in the gas removal device 212 when forcing hydraulic fluid into the fluid inlet 222 of the gas removal device 212.

Figure 5:
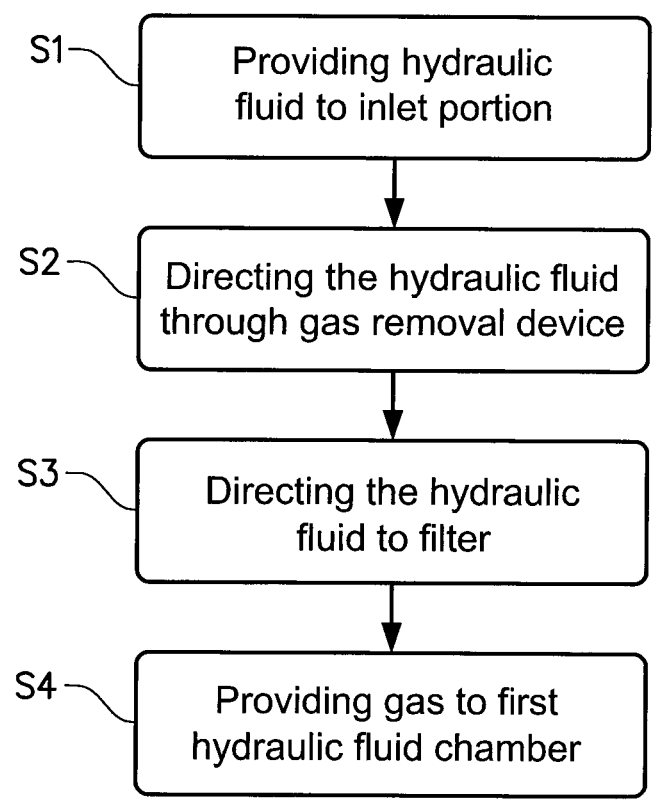
FIG. 5 is a flow chart of a method for removing gas from hydraulic fluid contained in a hydraulic fluid tank according to an example embodiment of the present invention.

Finally, reference is now made to FIG. 5 in combination with FIG. 2 in order to more clearly describe a method for removing gas from hydraulic fluid of the above described hydraulic fluid tank arrangement 200 according to an example embodiment of the present invention.

After the hydraulic fluid 204 has been used to operate e.g. one of the hydraulic cylinders of the wheel loader depicted in FIG. 1, the hydraulic fluid is provided S1 to the inlet portion 206 of the hydraulic fluid tank arrangement 200. At this stage, the hydraulic fluid 204 comprises gas bubbles 218 which are generated in the hydraulic fluid 204 during operation of the hydraulic cylinders. Thereafter, the hydraulic fluid 204 is directed S2 through the gas removal device 212. In detail, the hydraulic fluid is provided into the fluid inlet 222 of the gas removal device 212. In the gas removal device 212, the gas bubbles 218 are separated from the hydraulic fluid as described above in relation to FIG. 4. The hydraulic fluid 204, which is substantially free from, or at least only contains a heavily reduced number of gas bubbles 218 is further directed S3 to the oil filter 220. The gas bubbles 218 on the other hand move S4 through the gas outlet portion 216 of the gas removal device 212 and into the first hydraulic fluid chamber 228, where the gas bubbles 218 will rise towards the hydraulic fluid surface and crack.

The hydraulic fluid which was provided to the oil filter 220 is thereafter further directed through the oil filter 220 and into the second hydraulic fluid chamber 230. Once the hydraulic fluid 204 is provided in the second hydraulic fluid chamber 230 it can be used to operate, for example, the hydraulic cylinders of the working machine. This is achieved by forcing the hydraulic fluid out from the second chamber through the outlet portion 208 by means of the hydraulic pump 210.

It is to be understood that the present invention is not limited to the embodiments described above and illustrated in the drawings; rather, the skilled person will recognize that many changes and modifications may be made within the scope of the appended claims.

The invention claimed is:

1. A hydraulic fluid tank arrangement for a working machine, the arrangement comprising
a hydraulic fluid tank;
an inlet portion, wherein the inlet portion receives hydraulic fluid into the hydraulic fluid tank;
an oil filter arranged in fluid communication with the inlet portion;
a cyclone deaerator arranged in fluid communication with the oil filter downstream the inlet portion and upstream the oil filter, wherein the cyclone deaerator removes gas from the hydraulic fluid before the hydraulic fluid reaches the oil filter,
the hydraulic fluid tank comprising a first hydraulic fluid chamber,
the cyclone deaerator being arranged in fluid communication with the first hydraulic fluid chamber, wherein the cyclone deaerator provides gas removed from the hydraulic fluid into the first hydraulic fluid chamber,
a venting filter arranged in communication with the first hydraulic fluid chamber, wherein the venting filter directs gas in the first hydraulic fluid chamber out from the hydraulic fluid tank arrangement,
a second hydraulic fluid chamber, the second hydraulic fluid chamber being arranged downstream the oil filter in fluid communication with the oil filter and the outlet portion of the hydraulic fluid tank arrangement, and
a separation wall dividing the hydraulic fluid tank into the first hydraulic fluid chamber and the second hydraulic fluid chambers, the separation wall extending from an upper wall of the hydraulic fluid tank to a level below the gas outlet portion, wherein the first hydraulic fluid chamber is in filter-free fluid communication with the second hydraulic fluid chamber.

2. The hydraulic fluid tank arrangement according to claim 1, further comprising an outlet portion, wherein the outlet portion provides hydraulic fluid out from the hydraulic fluid tank.

3. The hydraulic fluid tank arrangement according to claim 1, wherein the cyclone deaerator comprises a gas outlet portion, wherein the gas outlet portion evacuates the gas removed from the hydraulic fluid out from the cyclone deaerator.

4. The hydraulic fluid tank arrangement according to claim 1, wherein the separation wall comprises an opening, wherein the opening directs gas in the second hydraulic fluid chamber into the first hydraulic fluid chamber.

5. The hydraulic fluid tank arrangement according to claim 2, wherein the hydraulic fluid tank arrangement comprises a pump arranged in fluid communication with the outlet portion downstream the outlet portion.

6. A working machine comprising a hydraulic fluid tank arrangement according to claim 1.

* * * * *